US008363424B2

(12) United States Patent
Lai

(10) Patent No.: US 8,363,424 B2
(45) Date of Patent: Jan. 29, 2013

(54) GROUNDING MECHANISM AND COMPUTER SYSTEM WITH AN MULTI-DIRECTIONAL GROUNDING COMPONENT

(75) Inventor: Kun-Hui Lai, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 487 days.

(21) Appl. No.: 12/703,728

(22) Filed: Feb. 10, 2010

(65) Prior Publication Data

US 2011/0120744 A1 May 26, 2011

(30) Foreign Application Priority Data

Nov. 23, 2009 (TW) ............................... 98221813 U

(51) Int. Cl.
*H05K 9/00* (2006.01)
*H05K 7/18* (2006.01)

(52) U.S. Cl. .......... 361/818; 174/351; 174/378; 174/51; 361/799; 361/800; 361/816

(58) Field of Classification Search ............... 361/679.5, 361/683, 685, 687, 689, 690–694, 695, 697, 361/699, 700, 704, 707–712, 717–719, 722, 361/726, 727, 730, 732, 736, 737, 740, 747, 361/748, 752, 753, 754, 756, 759, 760, 761, 361/776, 785, 796, 799, 800, 801, 802, 803, 361/804, 807–810, 816, 818, 825; 174/351, 174/355, 366, 369, 545, 15.2, 16.3, 35 R, 174/35 CG, 35 MS, 252, 259–266, 354; 439/947, 439/65–69, 76.2, 157, 330, 377, 325–328; 248/560, 561, 457, 463; 277/2, 29, 234, 277/235 R, 235 A, 235 B, 901, 920; 257/704–727, 257/737, 738, 778; 211/26; 24/295, 336, 24/457, 458

See application file for complete search history.

(56) References Cited

U.S. PATENT DOCUMENTS

| | | | | |
|---|---|---|---|---|
| 5,124,889 | A * | 6/1992 | Humbert et al. | 361/818 |
| 6,349,043 | B1 * | 2/2002 | Jensen et al. | 361/818 |
| 6,483,023 | B1 * | 11/2002 | Jacques | 174/358 |
| 2003/0218873 | A1 * | 11/2003 | Eromaki et al. | 361/816 |
| 2008/0047746 | A1 * | 2/2008 | Chen et al. | 174/369 |

* cited by examiner

*Primary Examiner* — Zachary M Pape
*Assistant Examiner* — Binh Tran
(74) *Attorney, Agent, or Firm* — Winston Hsu; Scott Margo

(57) ABSTRACT

A grounding mechanism includes a grounding end, and a clip device connected to the grounding end for electrically connecting an electronic device to the grounding end. The clip device includes a first clip for contacting against a lateral side of the electronic device in a first direction so as to ground the electronic device in the first direction, and a second clip for contacting against another side of the electronic device in a second direction different from the first direction so as to ground the electronic device in the second direction.

12 Claims, 4 Drawing Sheets

50
52
54
56
58

GROUNDING MECHANISM AND COMPUTER SYSTEM WITH AN MULTI-DIRECTIONAL GROUNDING COMPONENT

BACKGROUND OF THE INVENTION

1. Field of the Invention

The present invention relates to a grounding mechanism and a computer system with a multi-directional grounding component, and more particularly, to a grounding mechanism and a computer system utilizing a dual-directional clip to provide electrostatic discharging protection.

2. Description of the Prior Art

Electrostatic discharging protection of an electronic device is an important issue in use of some areas with dry weather. For example, when a user uses a notebook computer in a dry surrounding, static electricity is easily transmitted from hands of the user to electronic components disposed inside the notebook computer. As the notebook computer does not have electrostatic protecting function, the electronic components may be damaged by the static electricity. A conventional protection which disposes a conductive gasket around the electronic components for discharging the static electricity has drawbacks of long working hours, large assembly tolerance, and expensive manufacturing cost. A main board may have a short circuit, and the electronic components may be damaged due to disarticulation of the conductive gasket. Thus, design of a grounding mechanism with a simple structure for grounding the electronic device and for discharging the static electricity from the electronic device preferably is an important issue in the mechanical design industry.

SUMMARY OF THE INVENTION

The present invention provides a grounding mechanism and a computer system with a multi-directional grounding component for solving above drawbacks.

According to the claimed invention, a grounding mechanism includes a grounding end and a clip device connected to the grounding end for electrically connecting an electronic device to the grounding end. The clip device includes a first clip for contacting against a lateral side of the electronic device in a first direction so as to ground the electronic device in the first direction, and a second clip for contacting against another side of the electronic device in a second direction different from the first direction so as to ground the electronic device in the second direction.

According to the claimed invention, the clip device includes a base whereon a first slot is formed, the first clip is disposed on the base, and the first clip includes a contacting portion protruding out of a lateral side of the first slot for contacting against the electronic device.

According to the claimed invention, an end of the first clip is connected to the base, and the other end of the first clip protrudes out of the other side of the first slot.

According to the claimed invention, the grounding end includes a protruding portion, the clip device includes a lateral plank engaged with the protruding portion of the grounding end, a second slot is formed on the lateral plank, the second clip is disposed on the lateral plank, and the second clip includes a contacting portion protruding out of a lateral side of the second slot for contacting against the electronic device.

According to the claimed invention, an end of the second clip is connected to the lateral plank, and the other end of the second clip protrudes out of the other side of the second slot.

According to the claimed invention, the first direction is substantially perpendicular to the second direction.

According to the claimed invention, a computer system includes an electronic device and a grounding mechanism for grounding the electronic device. The grounding mechanism includes a grounding end and a clip device connected to the grounding end for electrically connecting the electronic device to the grounding end. The clip device includes a first clip for contacting against a lateral side of the electronic device in a first direction so as to ground the electronic device in the first direction, and a second clip for contacting against another side of the electronic device in a second direction different from the first direction so as to ground the electronic device in the second direction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
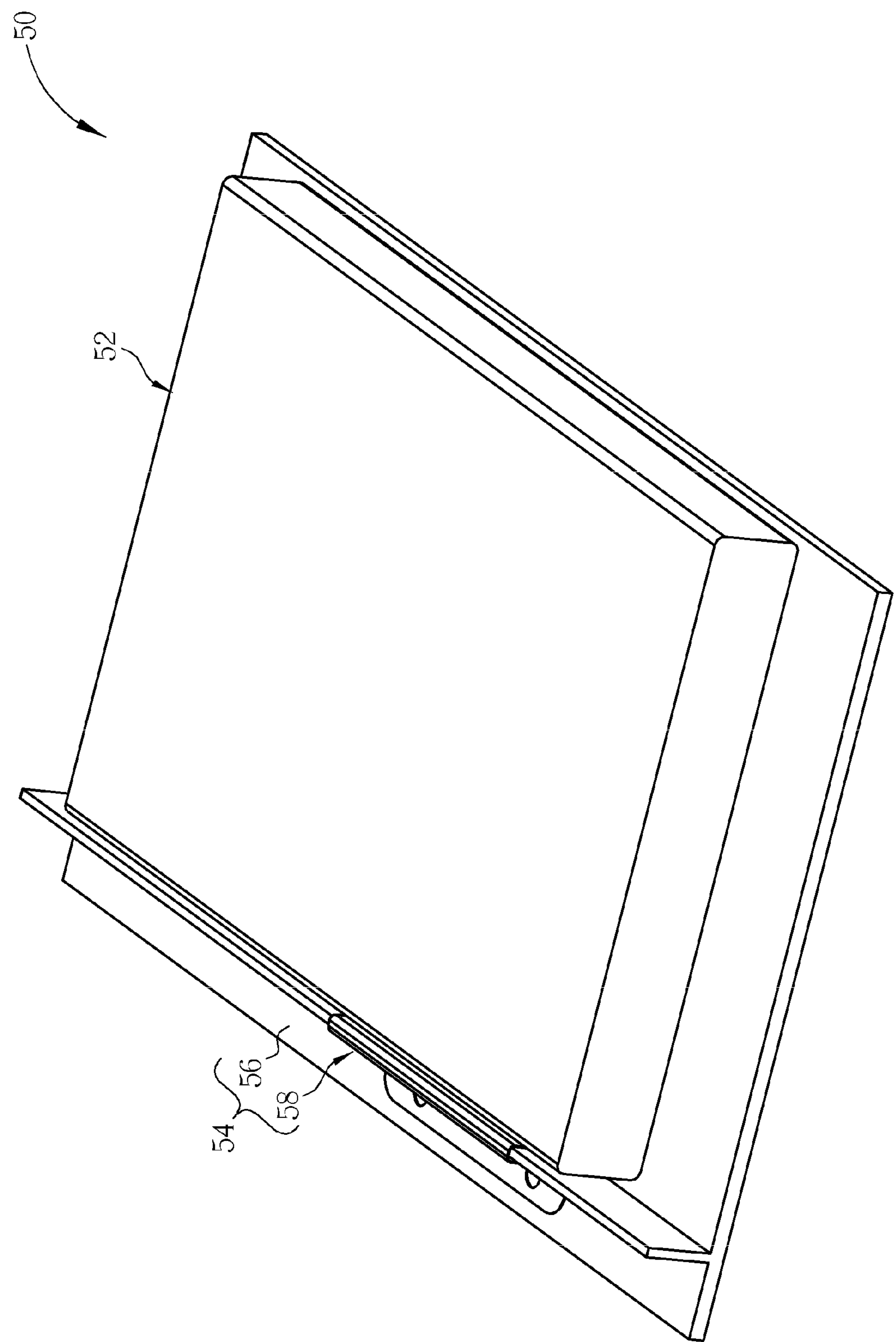
FIG. 1 and FIG. 2 are diagrams of a computer system in different view angles according to a preferred embodiment of the present invention.
Figure 2:
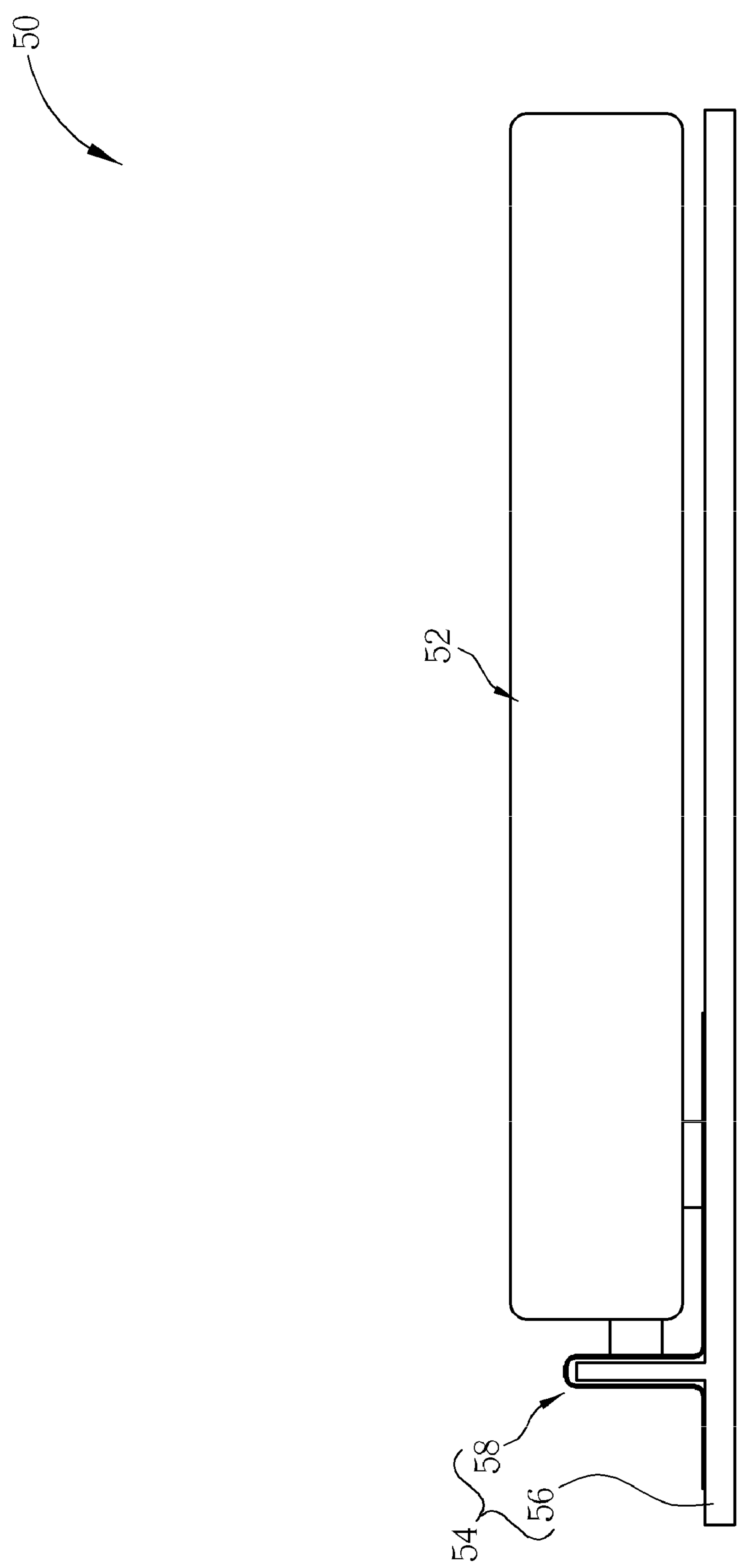
Figure 3:
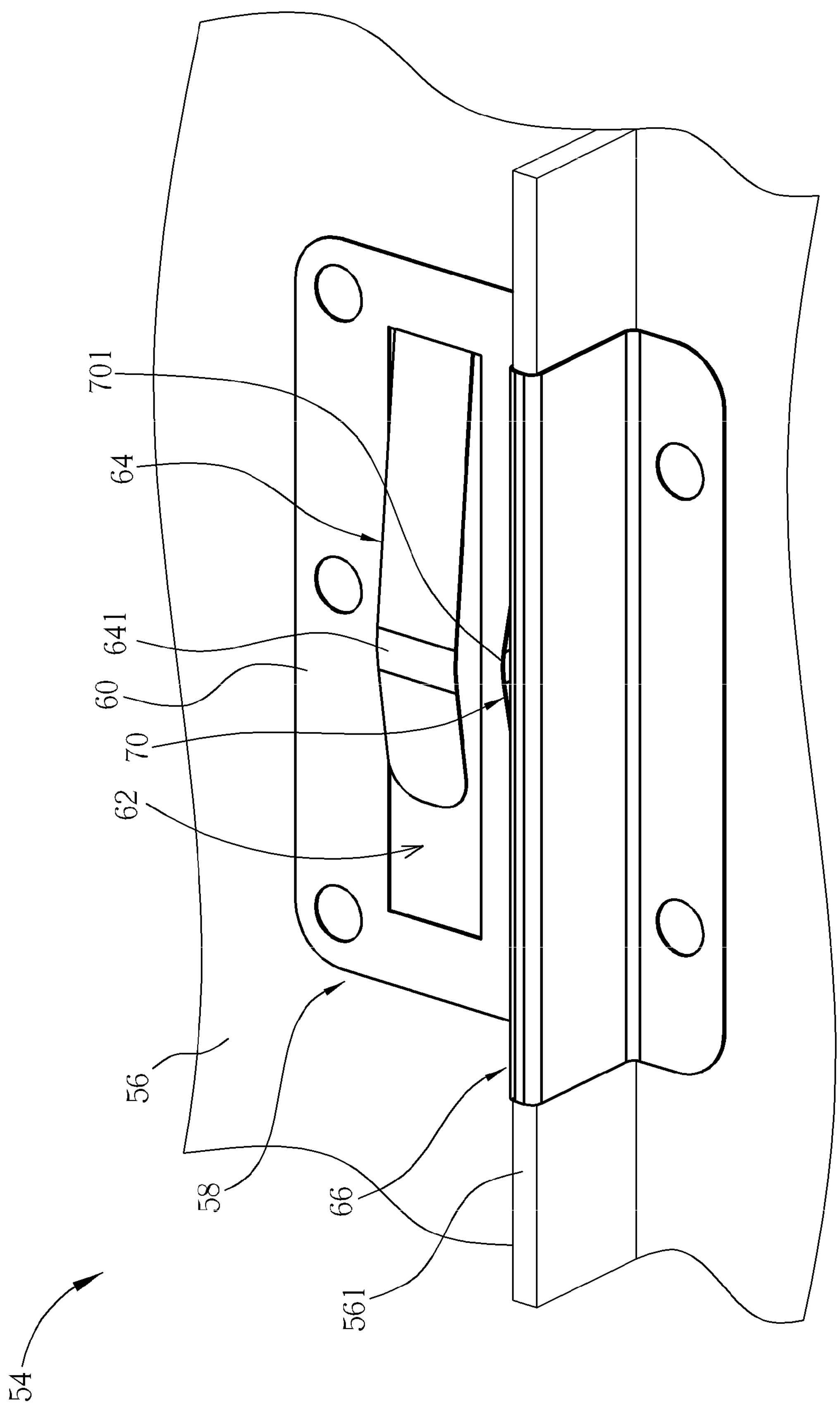
FIG. 3 and FIG. 4 are perspective drawings of a grounding mechanism in different view angles according to the preferred embodiment of the present invention.
Figure 4:
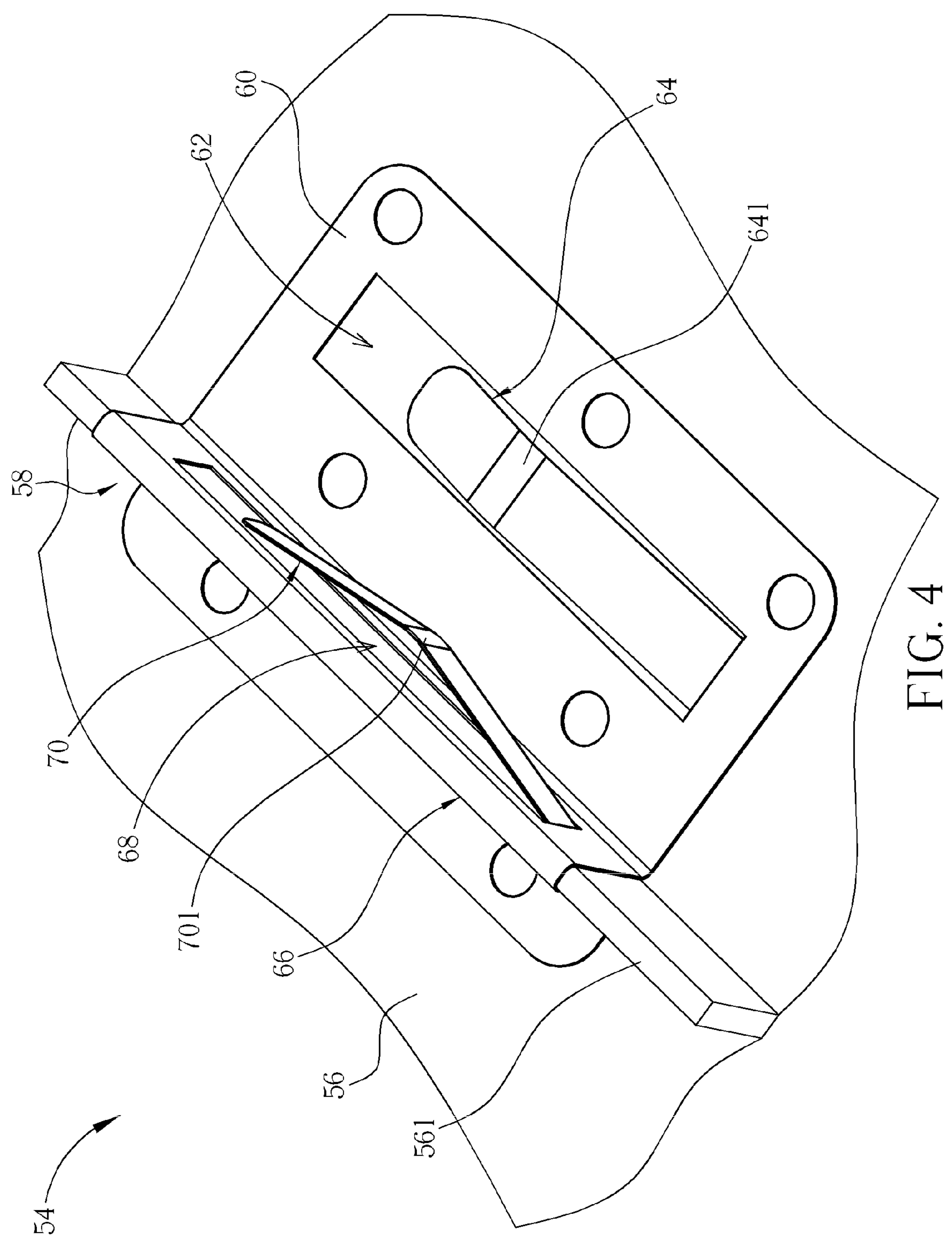

Please refer to FIG. 1 and FIG. 2. FIG. 1 and FIG. 2 are diagrams of a computer system 50 at different view angles according to a preferred embodiment of the present invention. The computer system 50 can be a desktop computer or a portable computer, such as a notebook computer. The computer system 50 includes an electronic device 52. The electronic device 52 can be a storage device, such as a hard disk, an optical disk drive, and so on. The computer system 50 further includes a grounding mechanism 54 for grounding the electronic device 52 so as to discharge static electricity of the electronic device 52. Please refer to FIG. 3 and FIG. 4. FIG. 3 and FIG. 4 are perspective drawings of the grounding mechanism 54 at different view angles according to the preferred embodiment of the present invention. The grounding mechanism 54 includes a grounding end 56. The grounding end 56 can be a casing made of plastic material. The grounding mechanism 54 further includes a clip device 58 connected to the grounding end 56 for electrically connecting the electronic device 52 to the grounding end 56. The clip device 58 can be made of metal material. The clip device 58 includes a base 60 whereon a first slot 62 is formed. The base 60 is disposed on a bottom side of the grounding end 56. The base 60 can be connected to the grounding end 56 in a heat melt manner. The clip device 58 further includes a first clip 64 disposed on the base 60. The first clip 64 includes a contacting portion 641 protruding out of a lateral side of the first slot 62 for contacting against the electronic device 52 in a first direction, so as to ground the electronic device 52 in the first direction. An end of the first clip 64 is connected to the base 60, and the other end of the first clip 64 can protrude out of the other side of the first slot 62. Therefore, the electronic device 52 is not interfered with the other end of the first clip 64 when the electronic device 52 is inserted into the computer system 50 from the other end of the first clip 64.

The grounding end 56 includes a protruding portion 561. The protruding portion 561 can be a protruding rib. The clip device 58 further includes a lateral plank 66 engaged with the protruding portion 561 of the grounding end 56. The lateral plank 66 can be perpendicularly connected to the base 60, substantially. The lateral plank 66 can be integrated with the base 60 monolithically. In addition, a second slot 68 is formed on the lateral plank 66. The clip device 58 further includes a second clip 70 disposed on the lateral plank 66. The second clip 70 includes a contacting portion 701 protruding out of a lateral side of the second slot 68 for contacting against the electronic device 52 in a second direction different from the first direction, so as to ground the electronic device 52 in the second direction. The first direction can be substantially perpendicular to the second direction. An end of the second clip 70 is connected to the lateral plank 66, and the other end of the second clip 70 can protrude out of the other side of the second slot 68. Therefore, the electronic device 52 is not interfered with the other end of the second clip 70 when electronic device 52 inserts into the computer system 50 from the other end of the second clip 70.

The grounding end 56 can be a plastic casing, and a lateral side of the grounding end 56 connected to the clip device 58 can be electroplated or sputtered by conductive material. The clip device 58 can be made of conductive material, such as metal material, and the electronic device 52 can be electrically connected to the grounding end 56 via the clip device 58 when the protruding portion 641 of the first clip 64 and the protruding portion 701 of the second clip 70 respectively contact against two sides of the electronic device 52 in the first direction and in the second direction, so as to ground the electronic device 52 for discharging the static electricity. Due to dual-directional contact of the first clip 64 and the second clip 70, the present invention can overcome drawbacks of the conventional structure with separate conductive components disposed on different directions, such as long working hours, large assembly tolerance, and expensive manufacturing cost. Besides, the clip device 58 can be designed according to standard dimensions of the corresponding hard disk or the optical disk drive for adapting to the other electronic devices, so that the clip device 58 is detachable and reusable. Furthermore, because the first clip 64 and the second clip 70 are directly connected to the conductive base 60 and the conductive lateral plank 66, a grounding resistance of the grounding mechanism 54 can be decreased by enlarging contacting areas between the grounding end 56 and the grounding mechanism 54. Thus, the conventional drawback of the large grounding resistivity due to separate conductive components for respectively grounding the electronic device via the conductive material on the separate conductive components can be overcome.

Comparing to the prior art, the grounding mechanism and the computer system of the present invention utilizes the dual-directional clip to ground the internal electronic components for promoting the electrostatic discharging protection, for preventing the conventional drawbacks, such as long working hours, large assembly tolerance, and expensive manufacturing cost by using the separate conductive components, and for preventing the internal electronic components from damaging due to disarticulation of the separate conductive components.

Those skilled in the art will readily observe that numerous modifications and alterations of the device and method may be made while retaining the teachings of the invention.

What is claimed is:

1. A grounding mechanism comprising:
a grounding end comprising a protruding portion; and
a clip device connected to the grounding end for electrically connecting an electronic device to the grounding end, the clip device comprising:
a first clip for contacting against a lateral side of the electronic device in a first direction so as to ground the electronic device in the first direction;
a second clip for contacting against another side of the electronic device in a second direction different from the first direction so as to ground the electronic device in the second direction;
a base whereon a first slot is formed, the first clip being disposed on the base; and
a lateral plank for clamping the protruding portion of the grounding end, a second slot being formed on the lateral plank, the second clip being disposed on the lateral plank, and the lateral plank being integrated with the base monolithically.

2. The grounding mechanism of claim 1, wherein the first clip comprises a contacting portion protruding out of a lateral side of the first slot for contacting against the electronic device.

3. The grounding mechanism of claim 2, wherein an end of the first clip is connected to the base, and the other end of the first clip protrudes out of the other side of the first slot.

4. The grounding mechanism of claim 1, wherein the second clip comprises a contacting portion protruding out of a lateral side of the second slot for contacting against the electronic device.

5. The grounding mechanism of claim 4, wherein an end of the second clip is connected to the lateral plank, and the other end of the second clip protrudes out of the other side of the second slot.

6. The grounding mechanism of claim 1, wherein the first direction is substantially perpendicular to the second direction.

7. A computer system comprising:
an electronic device; and
a grounding mechanism for grounding the electronic device, the grounding mechanism comprising:
a grounding end comprising a protruding portion; and
a clip device connected to the grounding end for electrically connecting the electronic device to the grounding end, the clip device comprising:
a first clip for contacting against a lateral side of the electronic device in a first direction so as to ground the electronic device in the first direction;
a second clip for contacting against another side of the electronic device in a second direction different from the first direction so as to ground the electronic device in the second direction;
a base whereon a first slot is formed, the first clip being disposed on the base; and
a lateral plank for clamping the protruding portion of the grounding end, a second slot being formed on the lateral plank, the second clip being disposed on the lateral plank, and the lateral plank being integrated with the base monolithically.

8. The computer system of claim 7, wherein the first clip comprises a contacting portion protruding out of a lateral side of the first slot for contacting against the electronic device.

9. The computer system of claim 8, wherein an end of the first clip is connected to the base, and the other end of the first clip protrudes out of the other side of the first slot.

10. The computer system of claim 7, wherein the second clip comprises a contacting portion protruding out of a side of the second slot for contacting against the electronic device.

11. The computer system of claim 10, wherein an end of the second clip is connected to the lateral plank, and the other end of the second clip protrudes out of the other side of the second slot.

12. The computer system of claim 7, wherein the first direction is substantially perpendicular to the second direction.

* * * * *